United States Patent
Wittig et al.

(10) Patent No.: US 8,392,063 B2
(45) Date of Patent: Mar. 5, 2013

(54) SYSTEMS AND METHODS FOR DETERMINING AN ABSOLUTE ROTATIONAL POSITION OF A VEHICLE HANDWHEEL

(75) Inventors: William H. Wittig, Saginaw, MI (US); Steven D. Klein, Munger, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1136 days.

(21) Appl. No.: 11/951,390

(22) Filed: Dec. 6, 2007

(65) Prior Publication Data

US 2009/0150026 A1 Jun. 11, 2009

(51) Int. Cl.
 *B62D 6/00* (2006.01)
(52) U.S. Cl. .................. 701/41; 180/446; 700/279
(58) Field of Classification Search .......... 180/402, 180/444, 446; 324/207.25; 700/279; 701/1, 701/41
See application file for complete search history.

(56) References Cited

U.S. PATENT DOCUMENTS

| | | | | |
|---|---|---|---|---|
| 4,664,211 A | * | 5/1987 | Oshita et al. | 180/446 |
| 4,890,683 A | * | 1/1990 | Matsuda et al. | 180/444 |
| 5,887,671 A | * | 3/1999 | Yuki et al. | 180/68.1 |
| 5,948,030 A | * | 9/1999 | Miller et al. | 701/41 |
| 5,978,721 A | * | 11/1999 | Kagawa et al. | 701/41 |
| 6,039,144 A | * | 3/2000 | Chandy et al. | 180/446 |
| 6,408,235 B1 | * | 6/2002 | Tanke et al. | 701/41 |
| 2003/0144780 A1 | * | 7/2003 | Recker et al. | 701/41 |
| 2003/0146038 A1 | * | 8/2003 | Mills et al. | 180/422 |
| 2004/0094351 A1 | * | 5/2004 | Higashi et al. | 180/402 |
| 2006/0009894 A1 | * | 1/2006 | Goto et al. | 701/41 |

OTHER PUBLICATIONS

Pending U.S. Appl. No. 60/938,754, filed May 18, 2007, entitled System and Method for Determining an Absolute Rotational Position of a Vehicle Steering Column.
Pending U.S. Appl. No. 11/930,830, filed Oct. 31, 2007, entitled System and Method for Determining an Absolute Rotational Position of a Vehicle Handwheel.

* cited by examiner

*Primary Examiner* — Khoi Tran
*Assistant Examiner* — Stephen Holwerda
(74) *Attorney, Agent, or Firm* — Cantor Colburn LLP

(57) ABSTRACT

Systems and methods for determining an absolute rotational position of the vehicle handwheel are provided. In one exemplary embodiment, a method includes determining a slope value based on the delta torque value associated with the vehicle steering system and the delta rotational position value associated with a vehicle handwheel. The method further includes setting an absolute position value indicating the absolute position of the vehicle handwheel equal to a predetermined steering travel limit of the vehicle handwheel when the slope value is within a predetermined slope range.

17 Claims, 14 Drawing Sheets

SYSTEMS AND METHODS FOR DETERMINING AN ABSOLUTE ROTATIONAL POSITION OF A VEHICLE HANDWHEEL

BACKGROUND

A vehicle has utilized an absolute position sensor to measure a position of a vehicle handwheel. However, a disadvantage with utilizing the absolute position sensor is that the absolute position sensor is relatively expensive to utilize in the vehicle.

SUMMARY

A method for determining an absolute rotational position of a vehicle handwheel in accordance with an exemplary embodiment is provided. The method includes determining first and second amounts of torque applied to the vehicle handwheel at first and second times, respectively. The method further includes determining first and second rotational positions of the vehicle handwheel at the first and second times, respectively. The method further includes determining a delta torque value based on a difference between the first and second amounts of torque. The method further includes determining a delta rotational position value based on a difference between the first and second rotational positions. The method further includes determining a slope value based on the delta torque value and the delta rotational position value. The method further includes setting an absolute position value indicating the absolute position of the vehicle handwheel equal to a predetermined steering travel limit of the vehicle handwheel when the slope value is within a predetermined slope range. The method further includes storing the absolute rotational position value in a memory device.

A system for determining an absolute rotational position of a vehicle handwheel in accordance with another exemplary embodiment is provided. The system includes a torque sensor configured to generate first and second signals indicative of first and second amounts of torque, respectively, applied to the vehicle handwheel at first and second times, respectively. The system further includes a position sensor configured to generate third and fourth signals indicative of first and second rotational positions, respectively, of the vehicle handwheel at the first and second times, respectively. The system further includes a microprocessor configured to receive the first and second signals from the torque sensor and the third and fourth signals from the position sensor. The microprocessor is further configured to determine a delta torque value based on a difference between the first and second amounts of torque. The microprocessor is further configured to determine a delta rotational position value based on a difference between the first and second rotational positions. The microprocessor is further configured to determine a slope value based on the delta torque value and the delta rotational position value. The microprocessor is further configured to set an absolute position value indicating the absolute position of the vehicle handwheel equal to a predetermined steering travel limit of the vehicle handwheel when the slope value is within a predetermined slope range. The microprocessor is further configured to store the absolute rotational position value in a memory device.

A method for determining an absolute rotational position of a vehicle handwheel in accordance with another exemplary embodiment is provided. The method includes determining first and second amounts of torque applied to the vehicle handwheel at first and second times, respectively. The method further includes determining third and fourth amounts of assist torque applied to a vehicle steering system at the first and second times, respectively. The method further includes determining a first total torque value based on the first amount of torque and the third amount of assist torque. The method further includes determining a second total torque value based on the second amount of torque and the fourth amount of assist torque. The method further includes determining first and second rotational positions of the vehicle handwheel at the first and second times, respectively. The method further includes determining a delta torque value based on a difference between the first and second total torque values. The method further includes determining a delta rotational position value based on a difference between the first and second rotational positions. The method further includes determining a slope value based on the delta torque value and the delta rotational position value. The method further includes setting an absolute position value indicating the absolute position of the vehicle handwheel equal to a predetermined steering travel limit of the vehicle handwheel when the slope value is within a predetermined slope range. The method further includes storing the absolute rotational position value in a memory device.

A system for determining an absolute rotational position of a vehicle handwheel in accordance with another exemplary embodiment is provided. The system includes a torque sensor configured to generate first and second signals indicative of first and second amounts of torque, respectively, applied to the vehicle handwheel at first and second times, respectively. The system further includes a position sensor configured to generate third and fourth signals indicative of first and second rotational positions, respectively, of the vehicle handwheel at the first and second times, respectively. The system further includes a microprocessor configured to receive the first and second signals from the torque sensor and the third and fourth signals from the position sensor. The microprocessor is further configured to determine third and fourth amounts of assist torque applied to a vehicle steering system at the first and second times respectively. The microprocessor is further configured to determine a first total torque value based on the first amount of torque and the third amount of assist torque. The microprocessor is further configured to determine a second total torque value based on the second amount of torque and the fourth amount of assist torque. The microprocessor is further configured to determine a delta torque value based on a difference between the first and second total torque values. The microprocessor is further configured to determine a delta rotational position value based on a difference between the first and second rotational positions, the microprocessor further configured to determine a slope value based on the delta torque value and the delta rotational position value. The microprocessor is further configured to set an absolute position value indicating the absolute position of the vehicle handwheel equal to a predetermined steering travel limit of the vehicle handwheel when the slope value is within a predetermined slope range. The microprocessor is further configured to store the absolute rotational position value in a memory device.

A method for determining an absolute rotational position of a vehicle handwheel in accordance with another exemplary embodiment is provided. The method includes determining first and second amounts of assist torque applied to a vehicle steering system at first and second times, respectively. The method further includes determining first and second rotational positions of the vehicle handwheel at the first and second times, respectively. The method further includes determining a delta torque value based on a difference between the first and second amounts of assist torque. The method further includes determining a delta rotational position value based on a difference between the first and second rotational positions. The method further includes determining a slope value based on the delta torque value and the delta rotational position value. The method further includes setting an absolute position value indicating the absolute position of the vehicle handwheel equal to a predetermined steering travel limit of the vehicle handwheel when the slope value is within a predetermined slope range. The method further includes storing the absolute rotational position value in a memory device.

DESCRIPTION OF EXEMPLARY EMBODIMENTS

Figure 1:
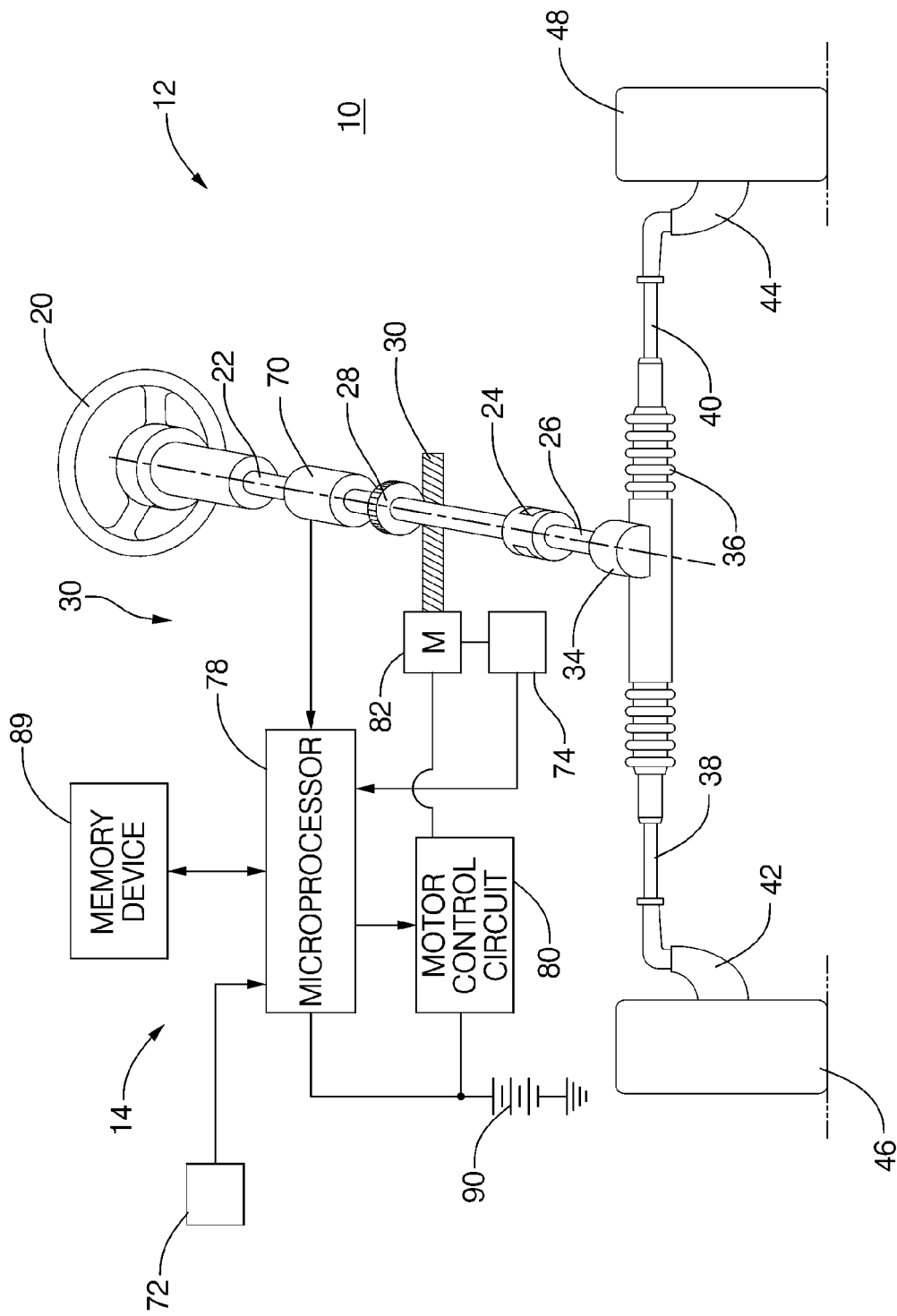
FIG. 1 is a schematic of a vehicle having a steering system and a control system in accordance with an exemplary embodiment.

Referring to FIG. 1, a vehicle 10 having a steering system 12 and a control system 14 is illustrated. For purposes of understanding, the term "signal" utilized herein is defined as any electrical signal or any stored or transmitted value. For example, a signal can comprise a voltage, or a current. Further, a signal can comprise any stored or transmitted value such as binary values, scalar values, or the like.

The steering system 12 is provided to steer the vehicle 10 in a desired direction. The steering system 12 includes a handwheel 20, an upper steering column 22, a universal joint 24, a lower steering column 26, a worm gear 28, a worm 30, a gear housing 34, a steering mechanism 36, tie rods 38, 40, steering knuckles 42, 44, and roadway wheels 46, 48. In one exemplary embodiment, the steering system 12 is an electric power steering system that utilizes a rack and pinion steering mechanism 36. The steering mechanism 36 includes a toothed rack (not shown) and a pinion gear (not shown) located under the gear housing 34. During operation, as the handwheel 20 is turned by a vehicle operator, the upper steering column 22 connected to the lower steering column 26 turns the pinion gear. Rotation of the pinion gear moves the toothed rack which moves the tie rods 38, 40 which in turn moves the steering knuckles 42, 44, respectively, which turns the roadway wheels 46, 48, respectively.

It should be noted that the vehicle handwheel 20 has two predetermined steering travel limits. The first predetermined steering travel limit is a full clockwise steering travel limit. The second predetermined steering travel limit is a full counter-clockwise steering travel limit. The first and second predetermined steering travel limits can be quantified in angular degrees or radians.

The control system 14 is provided to assist in controlling the steering system 12 and to determine an absolute rotational position of the vehicle handwheel 20. The control system 14 includes a column torque sensor 70, a vehicle speed sensor 72, a position sensor 74, a microprocessor 78, a motor control circuit 80, and a battery 90.

The steering column torque sensor 70 is provided to generate a signal indicative of an amount of torque being applied to the vehicle handwheel 20 and the upper steering column 22 by a vehicle operator. In one exemplary embodiment, the steering column torque sensor 70 includes a torsion bar (not shown) which outputs a variable-resistance signal to the controller 78 based on an amount of twist of the torsion bar. Of course, in alternative embodiments, other types of torque sensors known to those skilled in the art could be utilized.

The vehicle speed sensor 72 is provided to generate a signal indicative of a speed of the vehicle 10. The vehicle speed sensor 72 operably communicates with the microprocessor 78.

The position sensor 74 is provided to generate a signal indicative of a relative rotational or angular position of a rotor of the steering assist motor 82, which is further indicative of a relative rotational position of the vehicle handwheel 20. The position sensor 74 operably communicates with the microprocessor 78.

The microprocessor 78 is provided to generate control signals that are received by the motor control circuit 80 for controlling operation of the steering assist motor 82. The microprocessor 78 is further configured to determine an absolute rotational position of the vehicle handwheel 20, which will be described in further detail below. The microprocessor 78 is electrically coupled to the steering column torque sensor 70, the vehicle speed sensor 72, the position sensor 74, and the motor control circuit 80.

The motor control circuit 80 is provided to receive command torque control signals from the microprocessor 78 and to generate electrical currents for controlling operation of the steering assist motor 82. As shown, the motor control circuit 80 is electrically coupled between the microprocessor 78 and the steering assist motor 82. The motor 82 is configured to drive the worm 30 which is operably coupled to the worm gear 28 for moving the lower steering column 26, the steering mechanism 36, tie rods 38, 40, steering knuckles 42, 44, toward an operational position wherein the road wheels 46, 48 have a desired front road wheel angle.

The battery 90 provides electrical power to the microprocessor 78 and to the motor control circuit 80. As shown, the battery 90 is electrically coupled to the microprocessor 78 and to the motor control circuit 80.

Figure 2:
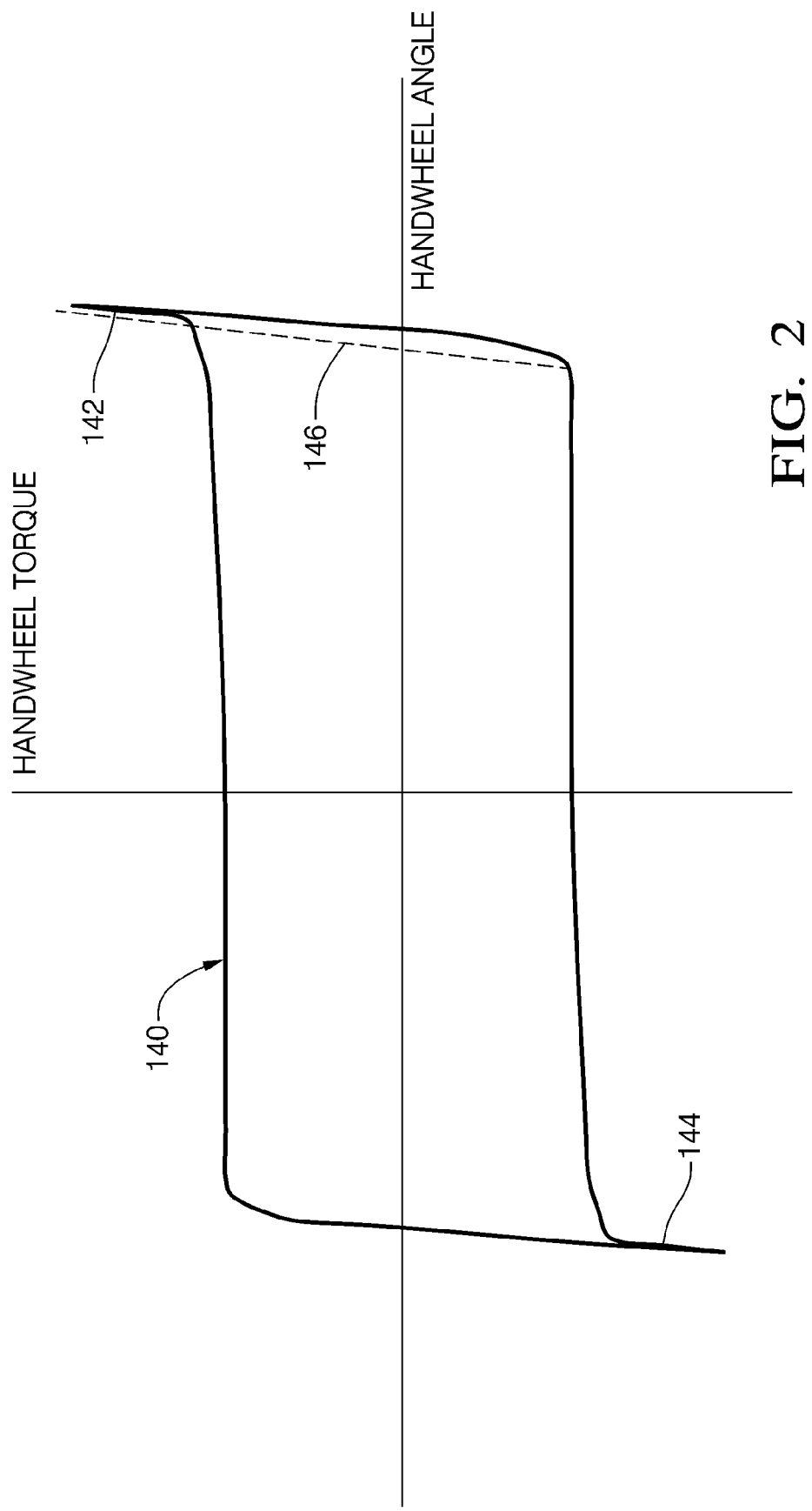
FIG. 2 is a schematic of a handwheel torque versus handwheel angle curve.
Figure 3:
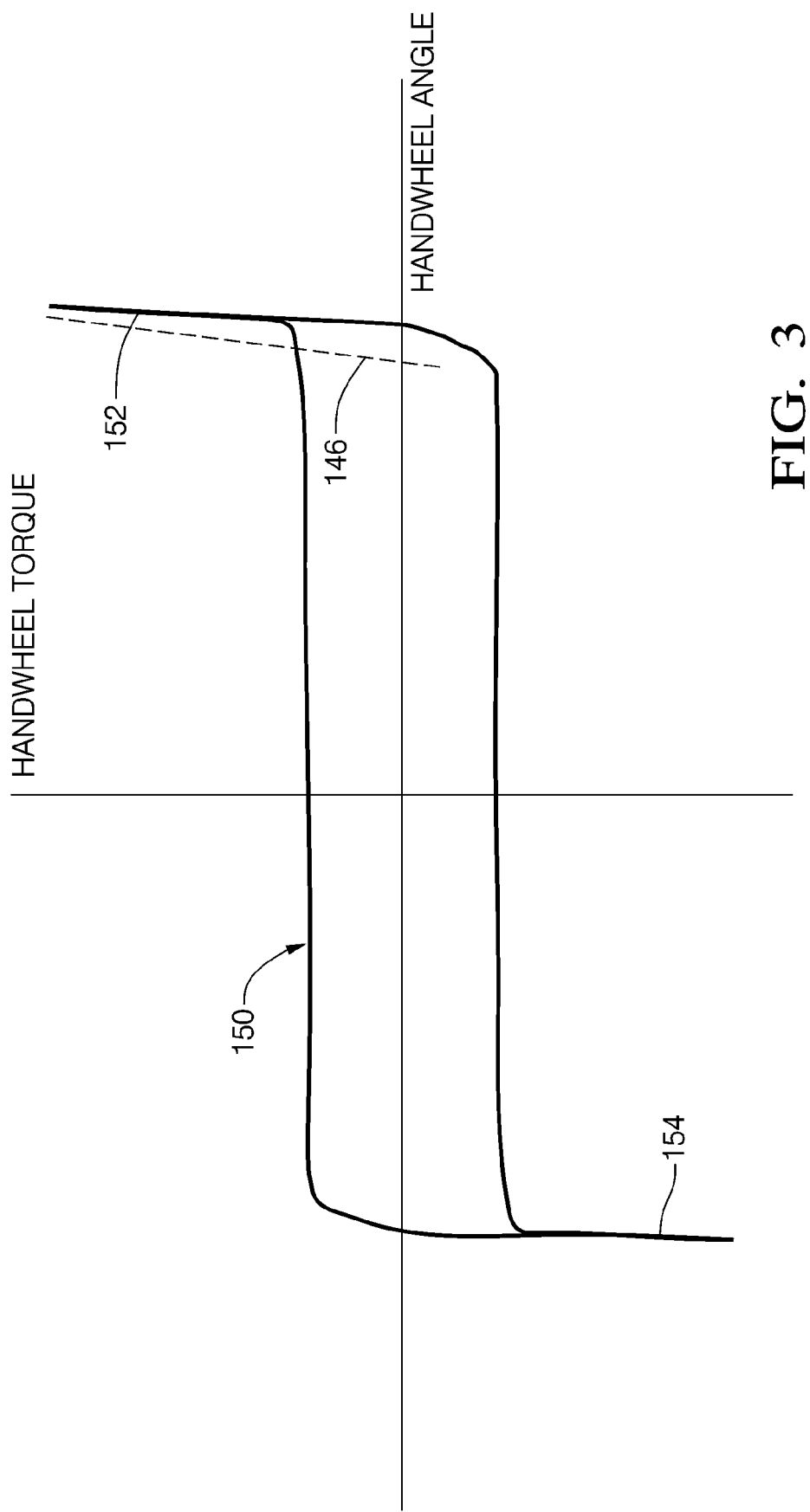
FIG. 3 is a schematic of another handwheel torque versus handwheel angle curve.

Referring to FIGS. 2 and 3, before providing a detailed description of a method for determining an absolute position of the vehicle handwheel 20, a brief description of exemplary curves that can be utilized to determine the absolute position of the vehicle handwheel 20 will be explained. Referring to FIG. 2, a handwheel torque versus handwheel angle curve 140 represents handwheel torque versus handwheel angles during a complete turning cycle when a vehicle is stationary or stopped. For example, when the vehicle operator has turned the handwheel 20 in a clockwise direction to a clockwise steering travel limit, as indicated by the portion 142 of the curve 140, the slope of the portion 142 is greater than or equal to a threshold slope value represented by line 146. Accordingly, the absolute position value indicating the absolute position in the vehicle handwheel can be set to the clockwise steering travel limit when the slope of the portion 142 is greater than or equal to the threshold slope value. Alternately, for example, when the vehicle operator has turned the handwheel 20 in a counter-clockwise direction to a counter-clockwise steering travel limit, as indicated by the portion 144 of the curve 140, the slope of the portion 144 is greater than or equal to the threshold slope value represented by the line 146. Accordingly, the absolute position value indicating the absolute position in the vehicle handwheel 20 can be set to the counter-clockwise steering travel limit when the slope of the portion 144 is greater than or equal to the threshold slope value.

Referring to FIG. 3, a handwheel torque versus handwheel angle curve 150 represents handwheel torque versus hand wheel angles during a complete turning cycle when a vehicle is being driven at a parking speed. For example, when the vehicle operator has turned the handwheel 20 in a clockwise direction to a clockwise steering travel limit, as indicated by the portion 152 of the curve 150, the slope of the portion 152 is greater than or equal to a the threshold slope value represented by line 146. Accordingly, the absolute position value indicating the absolute position in the vehicle handwheel can be set to the clockwise steering travel limit when the slope of the portion 152 is greater than or equal to the threshold slope value. Alternately, for example, when the vehicle operator has turned the handwheel 20 in a counter-clockwise direction to a counter-clockwise steering travel limit, as indicated by the portion 154 of the curve 150, the slope of the portion 154 is greater than or equal to the threshold slope value represented by the line 146. Accordingly, the absolute position value indicating the absolute position in the vehicle handwheel 20 can be set to the counter-clockwise steering travel limit when the slope of the portion 154 is greater than or equal to a predetermined slope value.

Figure 4:
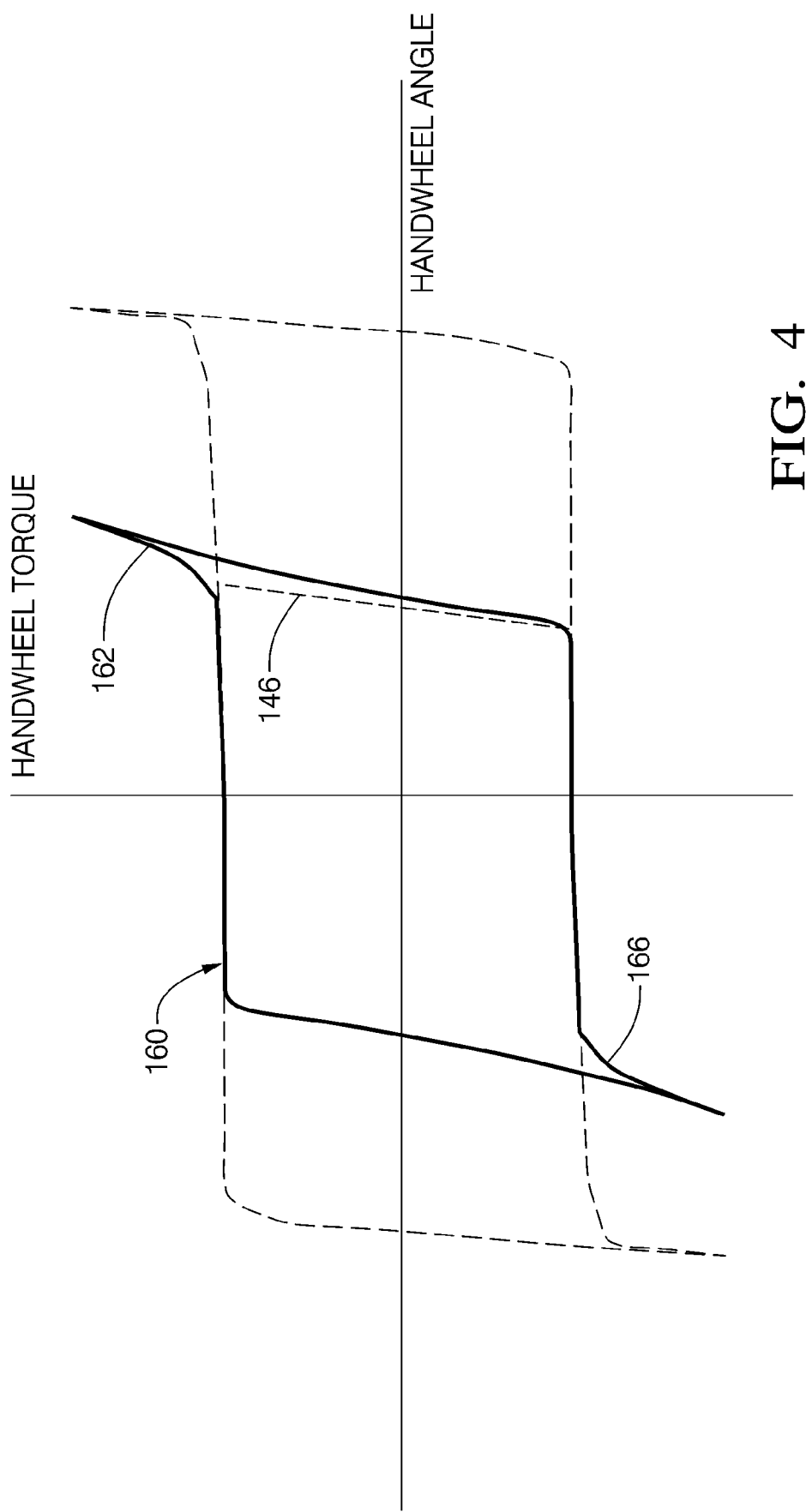
FIG. 4 is a schematic of another handwheel torque versus handwheel angle curve.

Referring to FIG. 4, a handwheel torque versus handwheel angle curve 160 represents handwheel torque versus hand wheel angles during a complete turning cycle when at least one of the vehicle wheels (46, 48) are contacting a curb of a roadway or other obstacle. When the vehicle wheels are contacting the curb over the roadway, the handwheel torque versus handwheel angles are not indicative of an absolute steering travel limit or the absolute rotational position of the vehicle handwheel 20. For example, when the vehicle operator has turned the handwheel 20 in a clockwise direction such that a vehicle wheel contacts a curb of a roadway as indicated by the portion 162 of the curve 160, the slope of the portion 162 is less than the threshold slope value represented by line 146. Accordingly, the absolute position value is not determined when the slope of the portion 162 is less than the threshold slope value. Alternately, for example, when the vehicle operator has turned the handwheel 20 in a counter-clockwise direction such that a vehicle wheel contacts a curb of a roadway as indicated by the portion 166 of the curve 160, the slope of the portion 166 is less than the threshold slope value represented by line 146. Accordingly, the absolute position value is not determined when the slope of the portion 162 is less than the threshold slope value.

Figure 5:
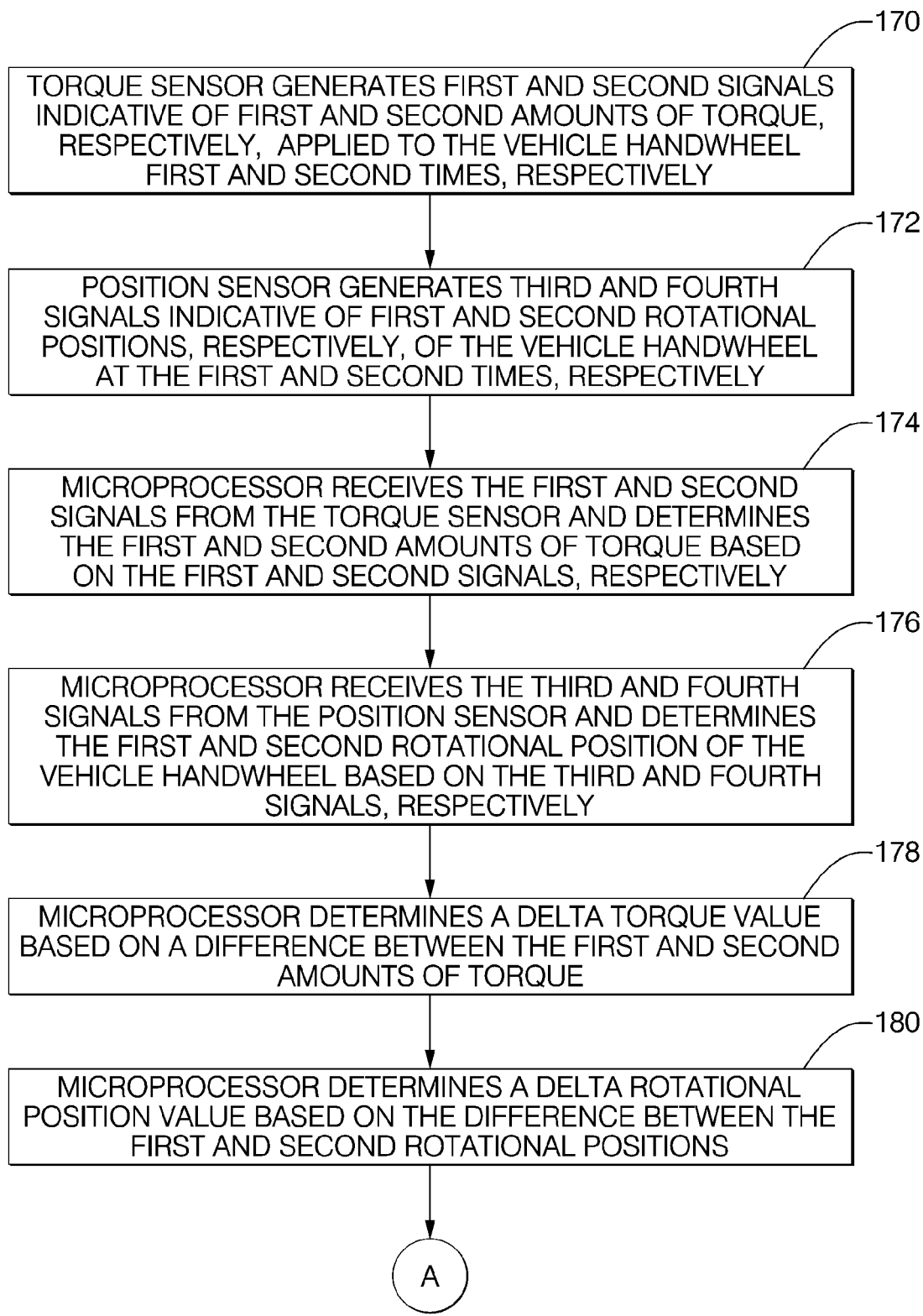
FIGS. 5-6 are flowcharts of a method for determining an absolute rotational position of the vehicle handwheel in accordance with another exemplary embodiment.
Figure 6:
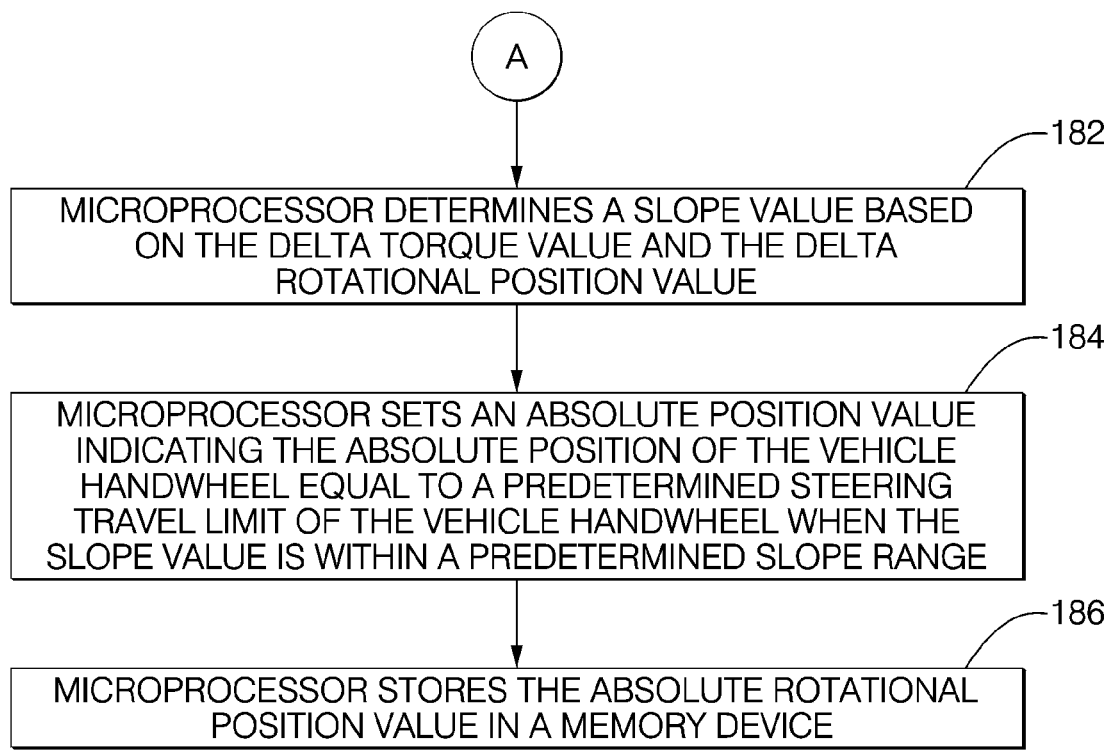

Referring to FIGS. 5 and 6, a flowchart of a method for determining an absolute rotational position of the vehicle handwheel 20 in accordance with another exemplary embodiment will now be explained.

At step 170, the torque sensor 70 generates first and second signals indicative of first and second amounts of torque, respectively, applied to the vehicle handwheel 20 at first and second times, respectively.

At step 172, the position sensor 74 generates third and fourth signals indicative of first and second rotational positions, respectively, of the vehicle handwheel 20 at the first and second times, respectively.

At step 174, the microprocessor 78 receives the first and second signals from the torque sensor 70 and determines the first and second amounts of torque based on the first and second signals, respectively.

At step 176, the microprocessor 78 receives the third and fourth signals from the position sensor 74 and determines the first and second rotational positions of the vehicle handwheel 20 based on the third and fourth signals, respectively.

At step 178, the microprocessor 78 determines a delta torque value based on a difference between the first and second amounts of torque.

At step 180, the microprocessor 78 determines a delta rotational position value based on a difference between the first and second rotational positions.

At step 182, the microprocessor 78 determines a slope value based on the delta torque value and the delta rotational position value. In one exemplary embodiment, the slope value is determined utilizing the following equation: slope value=delta torque value/delta rotational position value.

At step 184, the microprocessor 78 sets an absolute position value indicating the absolute position of the vehicle handwheel 20 equal to a predetermined steering travel limit of the vehicle handwheel 20 when the slope value is within a predetermined slope range.

At step 186, the microprocessor 78 stores the absolute rotational position value in a memory device 89.

Figure 7:
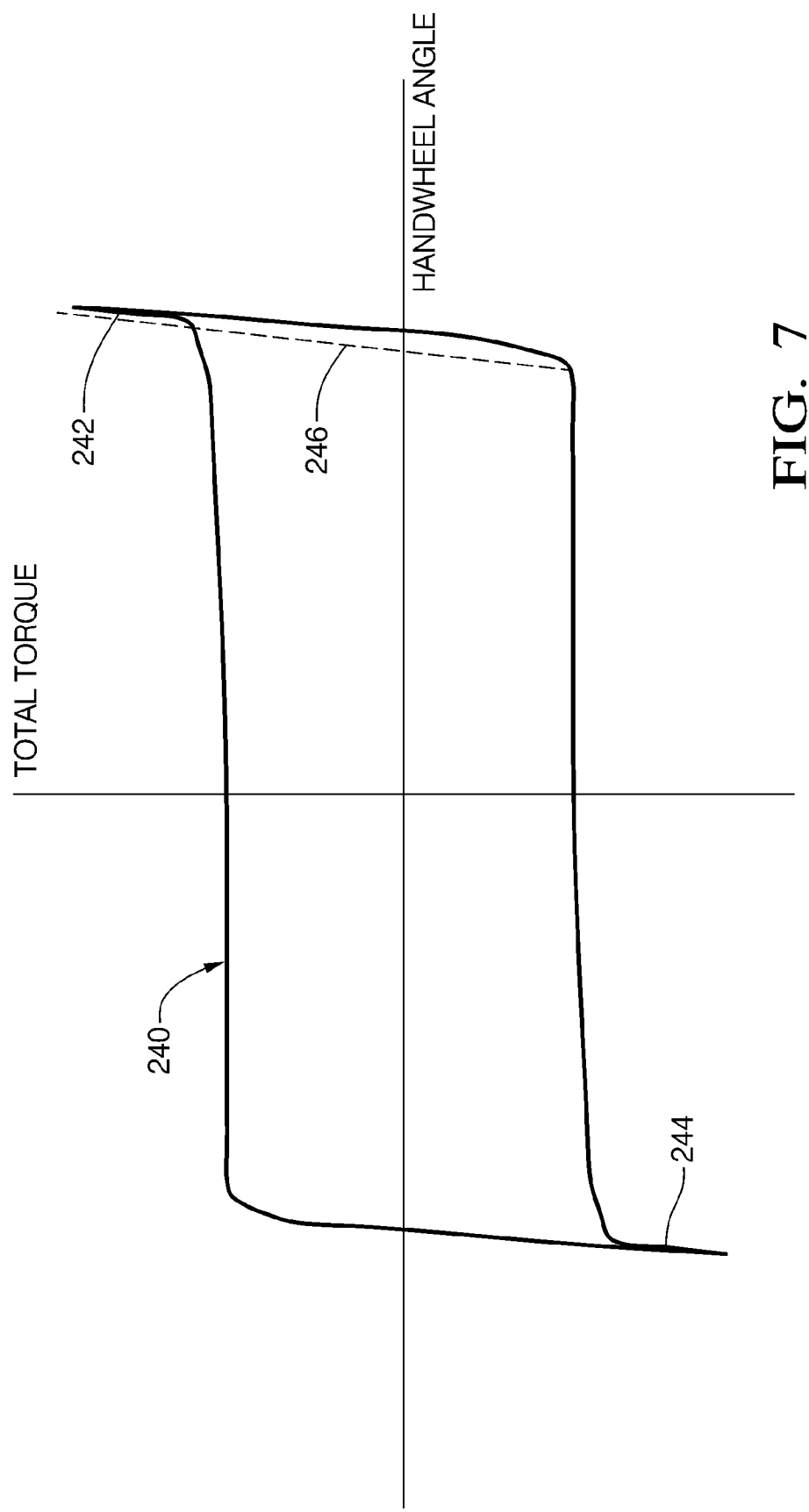
FIG. 7 is a schematic of a total torque versus handwheel angle curve.
Figure 8:
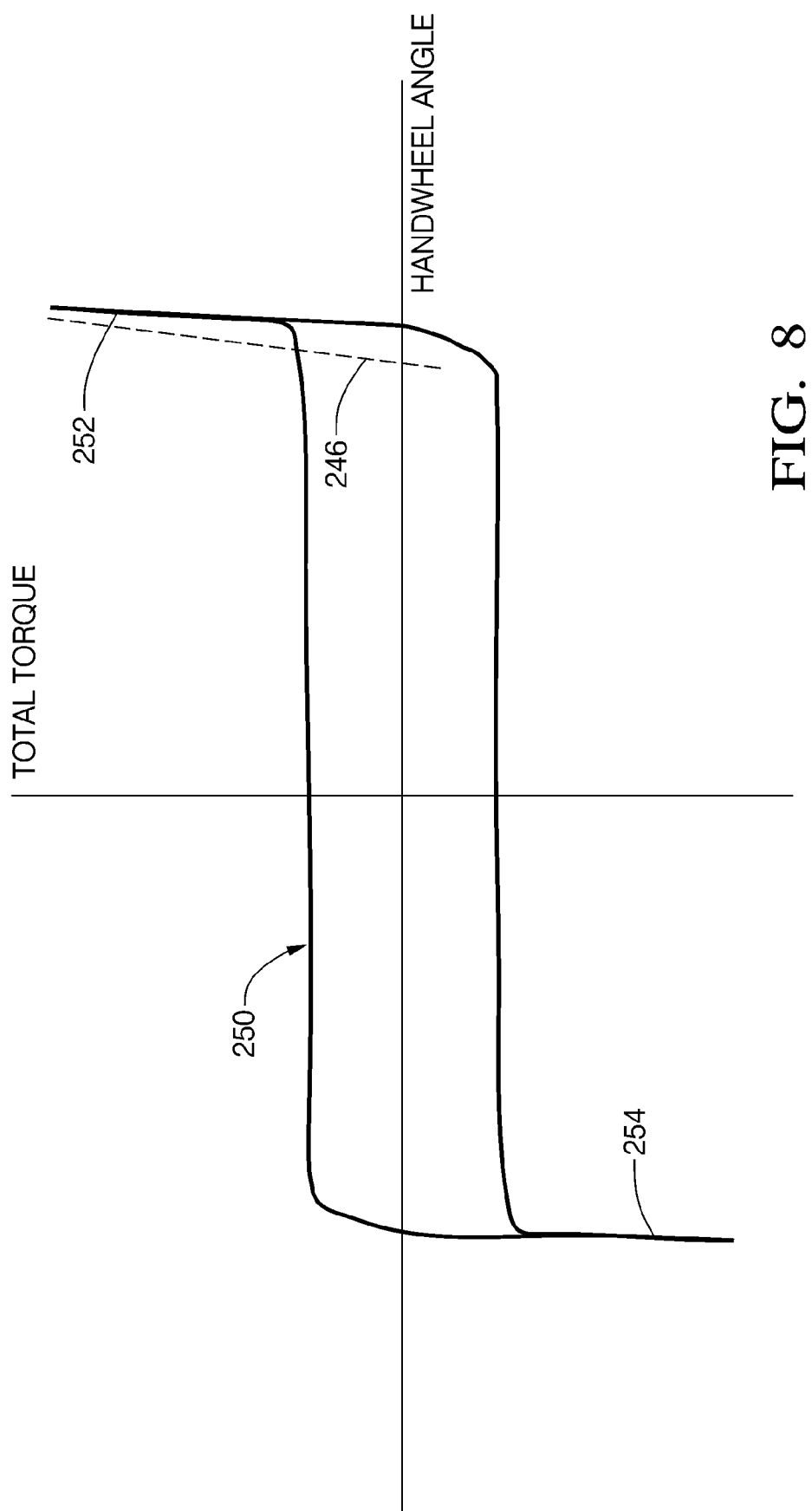
FIG. 8 is a schematic of another total torque versus handwheel angle curve.

Referring to FIGS. 7 and 8, before providing a detailed description of another method for determining an absolute position of the vehicle handwheel 20, a brief description of exemplary curves that can be utilized to determine the absolute position of the vehicle handwheel 20 will be explained.

Referring to FIG. 7, a total torque versus handwheel angle curve 240 represents total torque applied to the steering system versus handwheel angles during a complete turning cycle when a vehicle is stationary or stopped. For example, when the vehicle operator has turned the handwheel 20 in a clockwise direction to a clockwise steering travel limit, as indicated by the portion 242 of the curve 240, the slope of the portion 242 is greater than or equal to a threshold slope value represented by line 246. Accordingly, the absolute position value indicating the absolute position in the vehicle handwheel can be set to the clockwise steering travel limit when the slope of the portion 242 is greater than or equal to the threshold slope value. Alternately, for example, when the vehicle operator has turned the handwheel 20 in a counter-clockwise direction to a counter-clockwise steering travel limit, as indicated by the portion 244 of the curve 240, the slope of the portion 244 is greater than or equal to the threshold slope value represented by the line 246. Accordingly, the absolute position value indicating the absolute position in the vehicle handwheel 20 can be set to the counter-clockwise steering travel limit when the slope of the portion 244 is greater than or equal to the threshold slope value.

Referring to FIG. 8, a total torque versus handwheel angle curve 250 represents total torque applied to the steering system versus hand wheel angles during a complete turning cycle when a vehicle is being driven at a parking speed. For example, when the vehicle operator has turned the handwheel 20 in a clockwise direction to a clockwise steering travel limit, as indicated by the portion 252 of the curve 250, the slope of the portion 252 is greater than or equal to a the threshold slope value represented by line 246. Accordingly, the absolute position value indicating the absolute position in the vehicle handwheel can be set to the clockwise steering travel limit when the slope of the portion 252 is greater than or equal to the threshold slope value. Alternately, for example, when the vehicle operator has turned the handwheel 20 in a counter-clockwise direction to a counter-clockwise steering travel limit, as indicated by the portion 254 of the curve 250, the slope of the portion 254 is greater than or equal to the threshold slope value represented by the line 246. Accordingly, the absolute position value indicating the absolute position in the vehicle handwheel 20 can be set to the counter-clockwise steering travel limit when the slope of the portion 254 is greater than or equal to a predetermined slope value.

Figure 9:
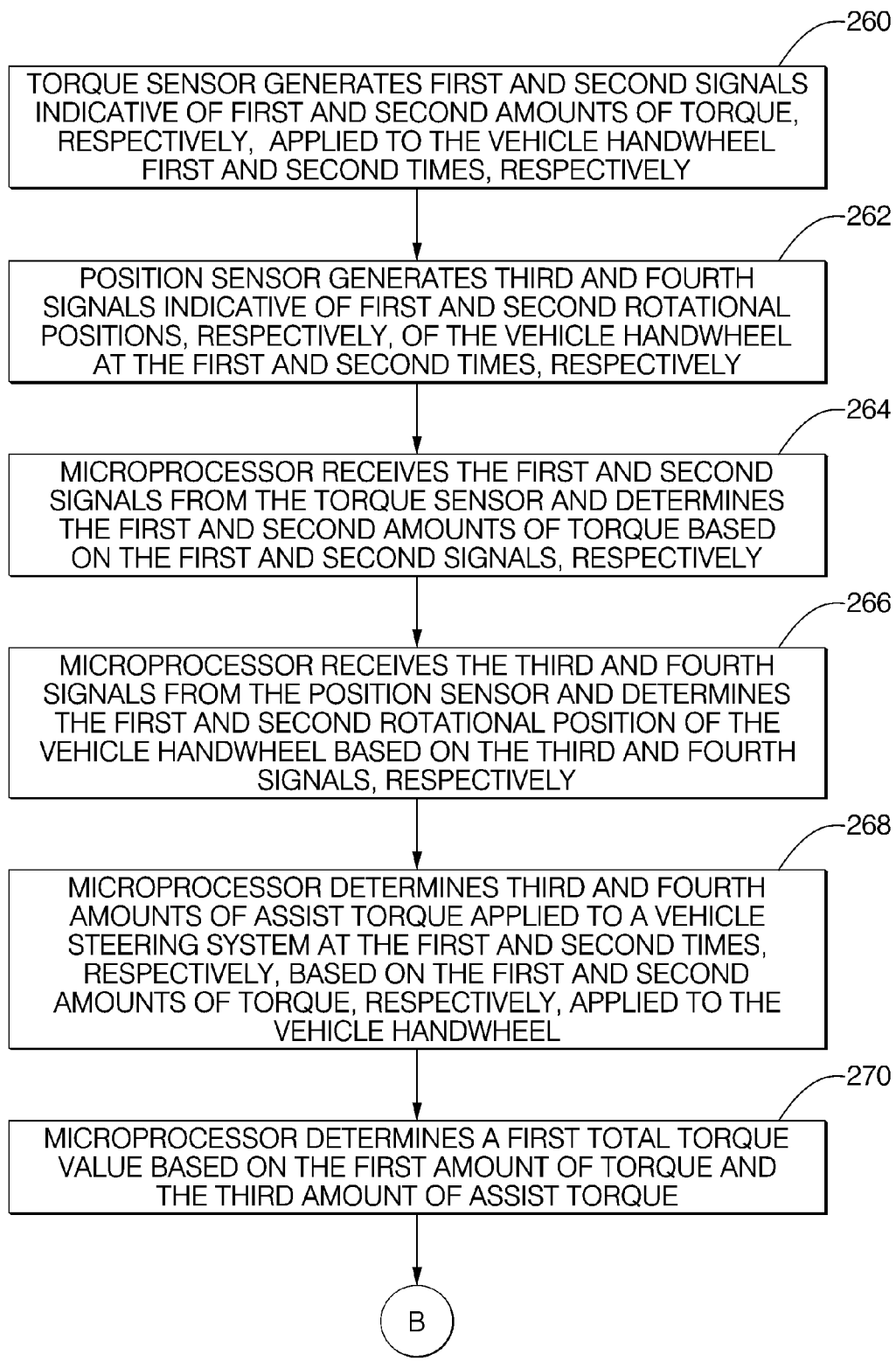
FIGS. 9-10 are flowcharts of a method for determining an absolute rotational position of the vehicle handwheel in accordance with another exemplary embodiment.
Figure 10:
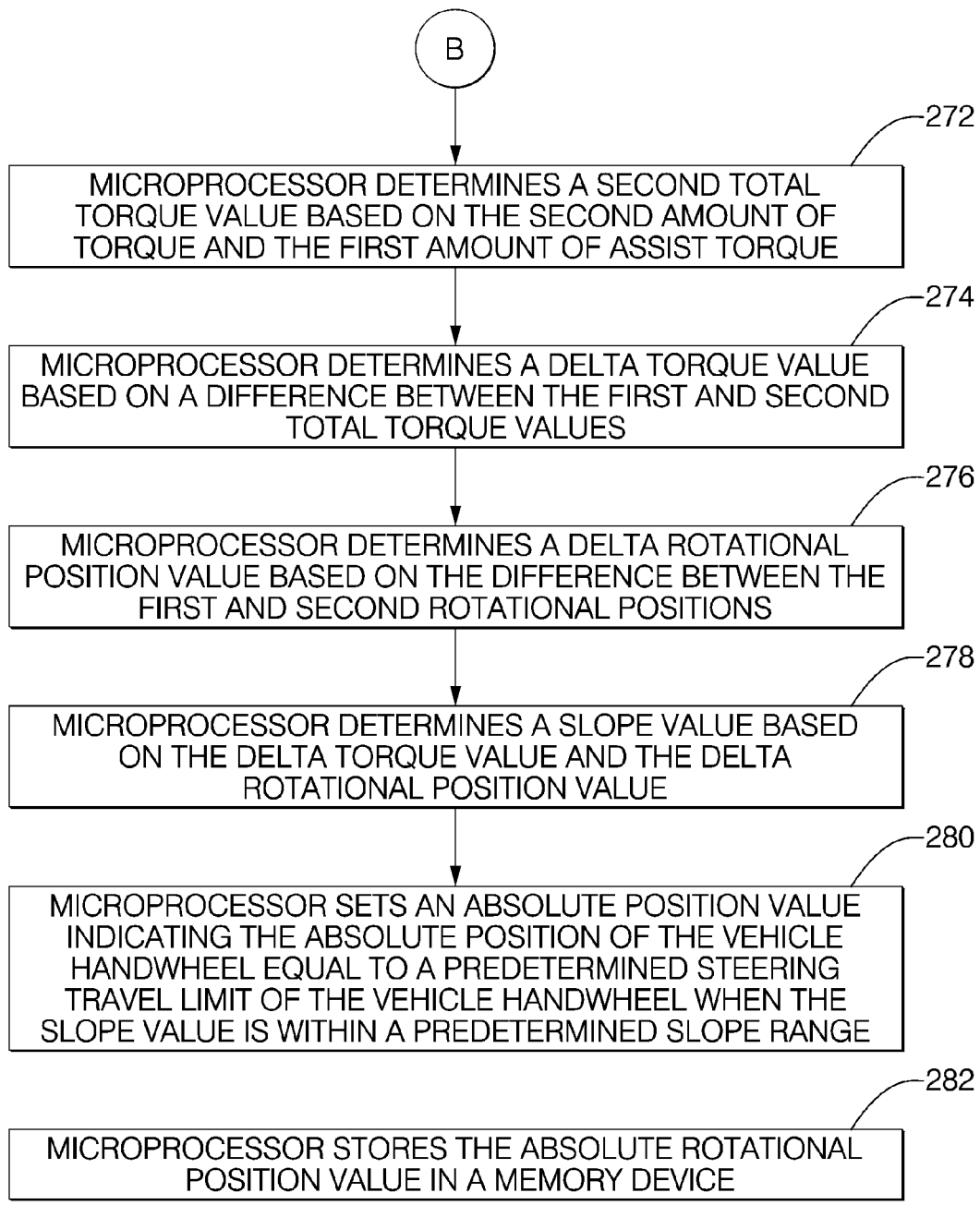

Referring to FIGS. 9 and 10, a flowchart of a method for determining an absolute rotational position of the vehicle handwheel 20 in accordance with another exemplary embodiment will now be explained.

At step 260, the torque sensor 70 generates first and second signals indicative of first and second amounts of torque, respectively, applied to the vehicle handwheel 20 at first and second times, respectively.

At step 262, the position sensor 74 generates third and fourth signals indicative of first and second rotational positions, respectively, of the vehicle handwheel 20 at the first and second times, respectively.

At step 264, the microprocessor 78 receives the first and second signals from the torque sensor 70 and determines the first and second amounts of torque based on the first and second signals, respectively.

At step 266, the microprocessor 78 receives the third and fourth signals from the position sensor 74 and determines the first and second rotational positions of the vehicle handwheel 20 based on the third and fourth signals, respectively.

At step 268, the microprocessor 78 determines third and fourth amounts of assist torque applied to a vehicle steering system 12 at the first and second times, respectively, based on the first and second amounts of torque, respectively, applied to the vehicle handwheel 20.

At step 270, the microprocessor 78 determines a first total torque value based on the first amount of torque and the third amount of assist torque.

At step 272, the microprocessor 78 determines a second total torque value based on the second amount of torque and the fourth amount of assist torque.

At step 274, the microprocessor 78 determines a delta torque value based on a difference between the first and second total torque values.

At step 276, the microprocessor 78 determines a delta rotational position value based on a difference between the first and second rotational positions.

At step 278, the microprocessor 78 determines a slope value based on the delta torque value and the delta rotational position value. In one exemplary embodiment, the slope value is determined utilizing the following equation: slope value=delta torque value/delta rotational position value.

At step 280, the microprocessor 78 sets an absolute position value indicating the absolute position of the vehicle handwheel 20 equal to a predetermined steering travel limit of the vehicle handwheel 20 when the slope value is within a predetermined slope range.

At step 282, the microprocessor 78 stores the absolute rotational position value in a memory device 89.

Figure 11:
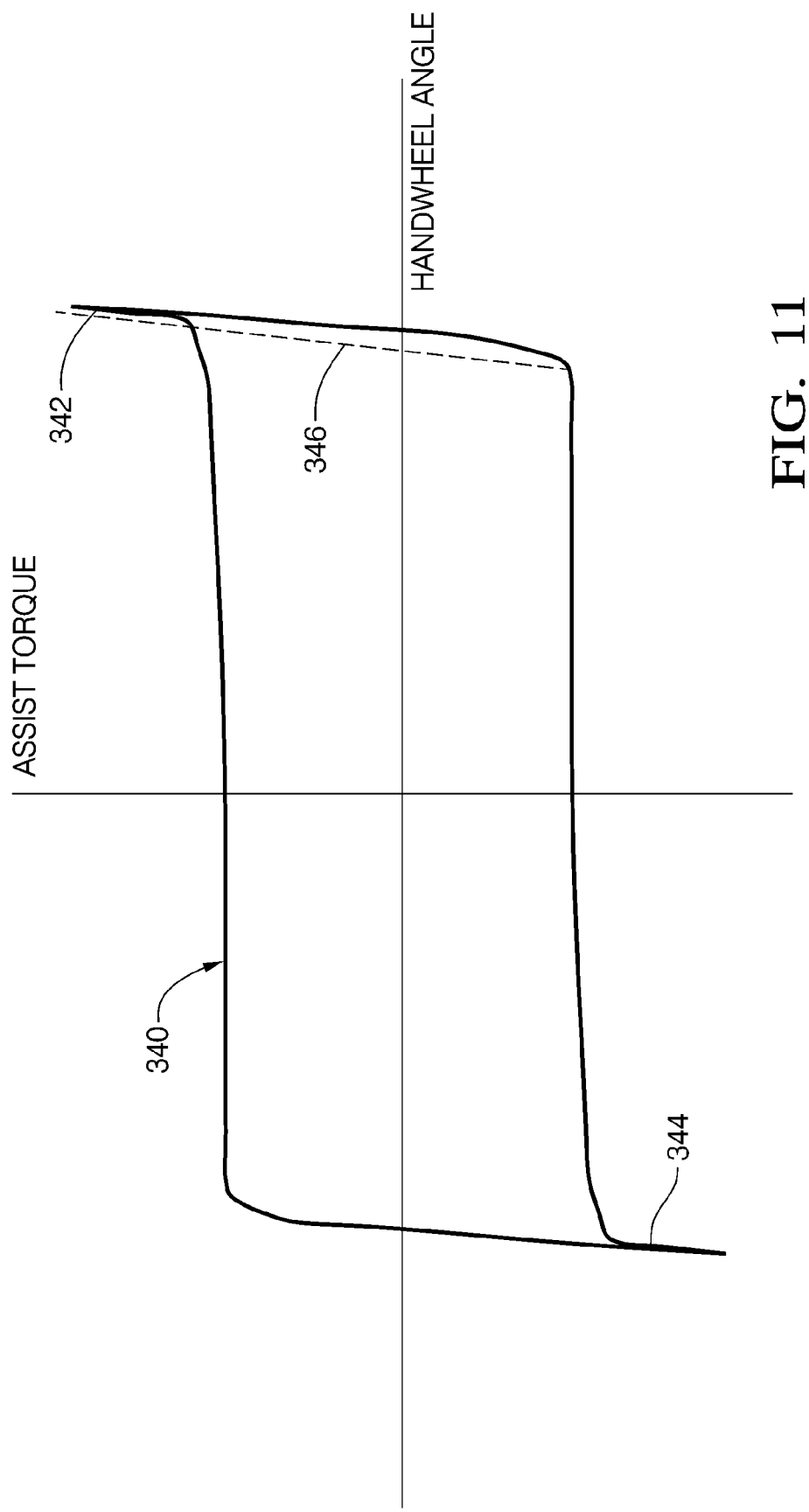
FIG. 11 is a schematic of an assist torque versus handwheel angle curve.
Figure 12:
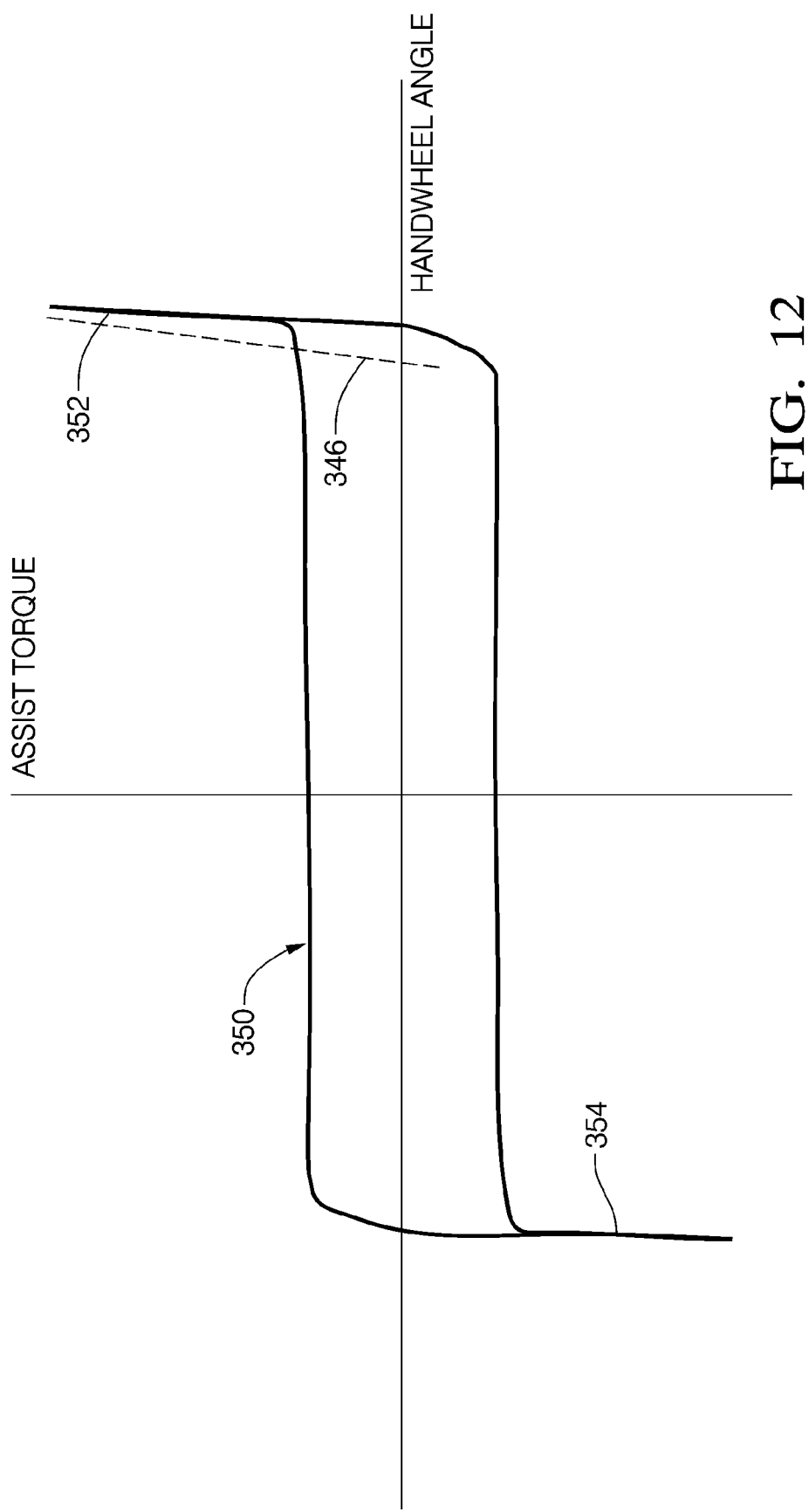
FIG. 12 is a schematic of another assist torque versus handwheel angle curve.

Referring to FIGS. 11 and 12, before providing a detailed description of another method for determining an absolute position of the vehicle handwheel 20, a brief description of exemplary curves that can be utilized to determine the absolute position of the vehicle handwheel 20 will be explained. Referring to FIG. 11, an assist torque versus handwheel angle curve 140 represents an assist torque produced by the motor 82 versus handwheel angles during a complete turning cycle when a vehicle is stationary or stopped. For example, when the vehicle operator has turned the handwheel 20 in a clockwise direction to a clockwise steering travel limit, as indicated by the portion 342 of the curve 340, the slope of the portion 342 is greater than or equal to a threshold slope value represented by line 346. Accordingly, the absolute position value indicating the absolute position in the vehicle handwheel can be set to the clockwise steering travel limit when the slope of the portion 342 is greater than or equal to the threshold slope value. Alternately, for example, when the vehicle operator has turned the handwheel 20 in a counter-clockwise direction to a counter-clockwise steering travel limit, as indicated by the portion 344 of the curve 340, the slope of the portion 344 is greater than or equal to the threshold slope value represented by the line 346. Accordingly, the absolute position value indicating the absolute position in the vehicle handwheel 20 can be set to the counter-clockwise steering travel limit when the slope of the portion 344 is greater than or equal to the threshold slope value.

Referring to FIG. 12, an assist torque versus handwheel angle curve 150 represents an assist torque produced by the motor 82 versus handwheel angles during a complete turning cycle when a vehicle is being driven at a parking speed. For example, when the vehicle operator has turned the handwheel 20 in a clockwise direction to a clockwise steering travel limit, as indicated by the portion 352 of the curve 350, the slope of the portion 352 is greater than or equal to a the threshold slope value represented by line 346. Accordingly, the absolute position value indicating the absolute position in the vehicle handwheel can be set to the clockwise steering travel limit when the slope of the portion 352 is greater than or equal to the threshold slope value. Alternately, for example, when the vehicle operator has turned the handwheel 20 in a counter-clockwise direction to a counter-clockwise steering travel limit, as indicated by the portion 354 of the curve 350, the slope of the portion 354 is greater than or equal to the threshold slope value represented by the line 346. Accordingly, the absolute position value indicating the absolute position in the vehicle handwheel 20 can be set to the counter-clockwise steering travel limit when the slope of the portion 354 is greater than or equal to a predetermined slope value.

Figure 13:
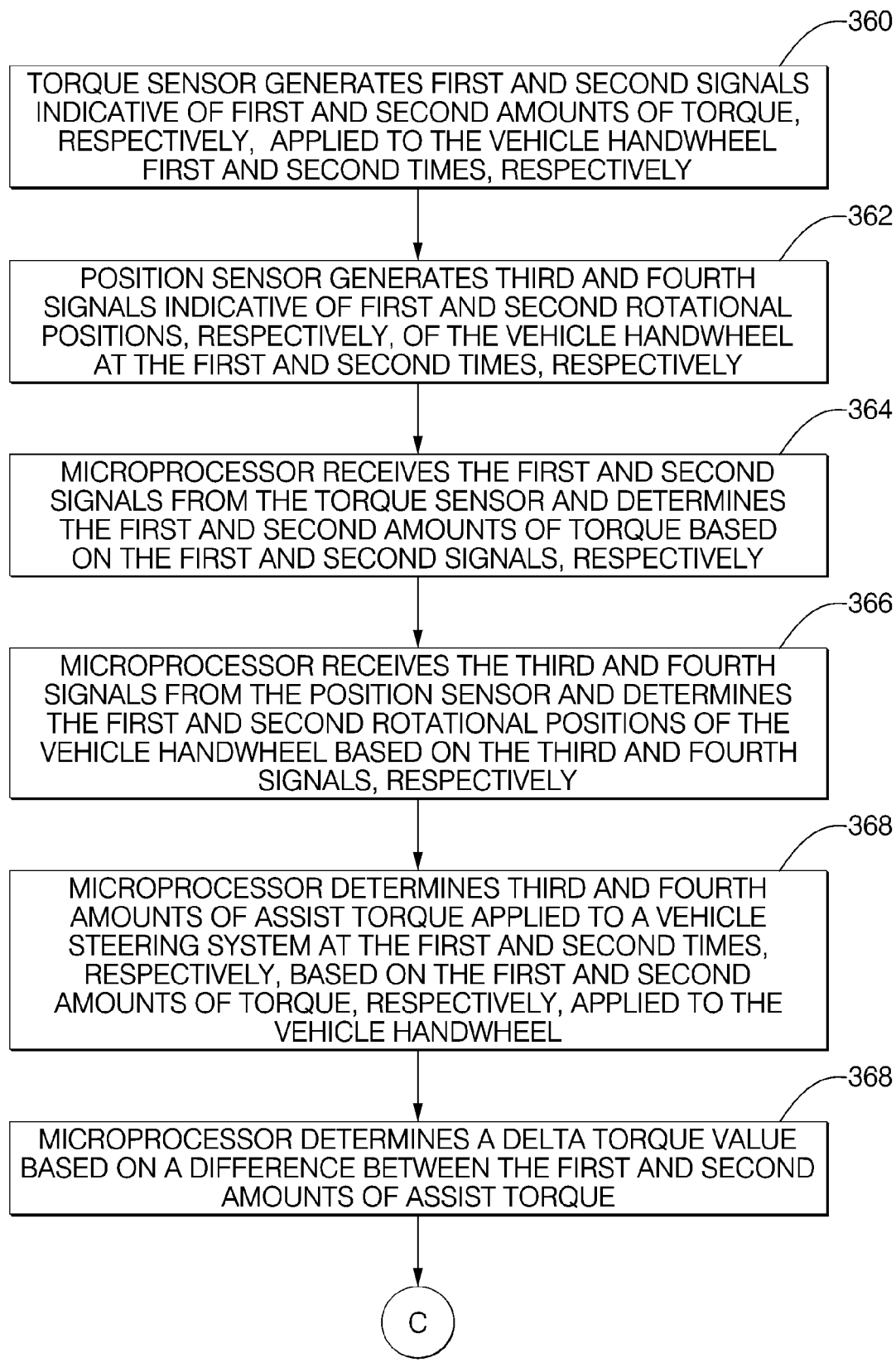
FIGS. 13-14 are flowcharts of a method for determining an absolute rotational position of the vehicle handwheel in accordance with another exemplary embodiment.
Figure 14:
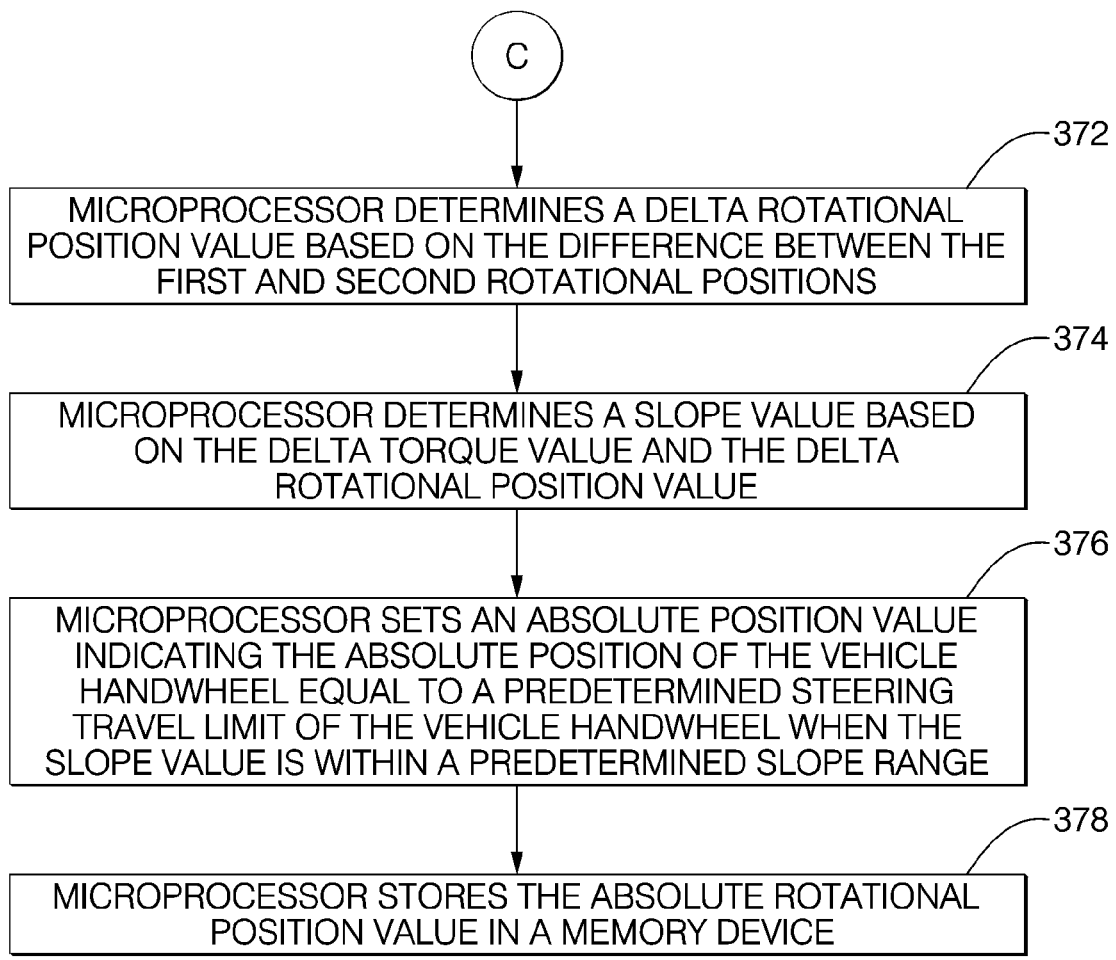

Referring to FIGS. 13 and 14, a flowchart of a method for determining an absolute rotational position of the vehicle handwheel 20 in accordance with another exemplary embodiment will now be explained.

At step 360, the torque sensor 70 generates first and second signals indicative of first and second amounts of torque, respectively, applied to the vehicle handwheel 20 at first and second times, respectively.

At step 362, the position sensor 74 generates third and fourth signals indicative of first and second rotational positions, respectively, of the vehicle handwheel 20 at the first and second times, respectively.

At step 364, the microprocessor 78 receives the first and second signals from the torque sensor 70 and determines the first and second amounts of torque based on the first and second signals, respectively.

At step 366, the microprocessor 78 receives the third and fourth signals from the position sensor 74 and determines the first and second rotational positions of the vehicle handwheel 20 based on the third and fourth signals, respectively.

At step 368, the microprocessor 78 determines third and fourth amounts of assist torque applied to the vehicle steering system 12 at the first and second times, respectively, based on the first and second amounts of torque, respectively, applied to the vehicle handwheel 20.

At step 370, the microprocessor 78 determines a delta torque value based on a difference between the first and second amounts of assist torque.

At step 372, the microprocessor 78 determines a delta rotational position value based on a difference between the first and second rotational positions.

At step 374, the microprocessor 78 determines a slope value based on the delta torque value and the delta rotational position value. In one exemplary embodiment, the slope value is determined utilizing the following equation: slope value=delta torque value/delta rotational position value.

At step 376, the microprocessor 78 sets an absolute position value indicating the absolute position of the vehicle handwheel 20 equal to a predetermined steering travel limit of the vehicle handwheel 20 when the slope value is within a predetermined slope range.

At step 378, the microprocessor 78 stores the absolute rotational position value in the memory device 89.

The systems and methods for determining an absolute rotational position of a vehicle handwheel represent a substantial advantage over other systems and methods. In particular, the systems and methods have a technical effect of determining the absolute rotational position of a vehicle handwheel without utilizing an absolute rotational position sensor.

As described above, the above-described methods can be embodied at least in part in the form of computer-implemented software algorithms and apparatuses for practicing those processes. In exemplary embodiments, the methods are embodied at least in part in computer program code executed by one or more elements. The present methods may be embodied in the form of computer program code containing instructions stored in tangible media, such as floppy diskettes, CD-ROMs, hard drives, flash memory, or any other computer-readable storage medium, wherein, when the computer program code is loaded into and executed by a microprocessor, the microprocessor becomes an apparatus for practicing the invention.

We claim:

1. A method for determining an absolute rotational position of a vehicle handwheel, comprising:
   determining first and second amounts of torque applied to the vehicle handwheel at first and second times, respectively;
   determining first and second relative rotational positions of the vehicle handwheel at the first and second times, respectively;
   determining a delta torque value based on a difference between the first and second amounts of torque;
   determining a delta rotational position value based on a difference between the first and second relative rotational positions;
   determining a slope value based on the delta torque value and the delta rotational position value;
   using a microprocessor to determine when the slope value is within a predetermined slope range and to set an absolute rotational position value equal to a predetermined steering travel limit of the vehicle handwheel, wherein the absolute rotational position value indicates the absolute rotational position of the vehicle handwheel when the slope value is within the predetermined slope range; and
   using the microprocessor to store the absolute rotational position value in a memory device.

2. The method of claim 1, wherein the predetermined steering travel limit is at least one of a predetermined clockwise steering travel limit and a predetermined counter-clockwise steering travel limit.

3. The method of claim 1, wherein the slope value is within the predetermined slope range when the slope value is greater than or equal to a threshold slope value.

4. A system for determining an absolute rotational position of a vehicle handwheel, comprising:
   a torque sensor configured to generate first and second signals indicative of first and second amounts of torque, respectively, applied to the vehicle handwheel at first and second times, respectively;
   a position sensor configured to generate third and fourth signals indicative of first and second relative rotational positions, respectively, of the vehicle handwheel at the first and second times, respectively; and
   a microprocessor configured to receive the first and second signals from the torque sensor and the third and fourth signals from the position sensor, the microprocessor further configured to determine a delta torque value based on a difference between the first and second amounts of torque, the microprocessor further configured to determine a delta rotational position value based on a difference between the first and second relative rotational positions, the microprocessor further configured to determine a slope value based on the delta torque value and the delta rotational position value, the microprocessor further configured to determine when the slope value is within a predetermined slope range and to set an absolute rotational position value equal to a predetermined steering travel limit of the vehicle handwheel when the slope value is within the predetermined slope range, the microprocessor further configured to store the absolute rotational position value in a memory device, the absolute rotational position value indicating the absolute rotational position of the vehicle handwheel.

5. The system of claim 4, wherein the predetermined steering travel limit is at least one of a predetermined clockwise steering travel limit and a predetermined counter-clockwise steering travel limit.

6. The system of claim 4, wherein the slope value is within the predetermined slope range when the slope value is greater than or equal to a threshold slope value.

7. A method for determining an absolute rotational position of a vehicle handwheel, comprising:
   determining first and second amounts of torque applied to the vehicle handwheel at first and second times, respectively;
   determining third and fourth amounts of assist torque applied to a vehicle steering system at the first and second times, respectively;
   determining a first total torque value based on the first amount of torque and the third amount of assist torque;
   determining a second total torque value based on the second amount of torque and the fourth amount of assist torque;
   determining first and second relative rotational positions of the vehicle handwheel at the first and second times, respectively;
   determining a delta torque value based on a difference between the first and second total torque values;

determining a delta rotational position value based on a difference between the first and second relative rotational positions;

determining a slope value based on the delta torque value and the delta rotational position value;

using a microprocessor to determine when the slope value is within a predetermined slope range and to set an absolute rotational position value equal to a predetermined steering travel limit of the vehicle handwheel, the absolute rotational position value indicating the absolute rotational position of the vehicle handwheel when the slope value is within the predetermined slope range; and using the microprocessor to store the absolute rotational position value in a memory device.

8. The method of claim 7, wherein the predetermined steering travel limit is at least one of a predetermined clockwise steering travel limit and a predetermined counter-clockwise steering travel limit.

9. The method of claim 7, wherein the slope value is within the predetermined slope range when the slope value is greater than or equal to a threshold slope value.

10. A system for determining an absolute rotational position of a vehicle handwheel, comprising:

a torque sensor configured to generate first and second signals indicative of first and second amounts of torque, respectively, applied to the vehicle handwheel at first and second times, respectively;

a position sensor configured to generate third and fourth signals indicative of first and second relative rotational positions, respectively, of the vehicle handwheel at the first and second times, respectively; and a microprocessor configured to receive the first and second signals from the torque sensor and the third and fourth signals from the position sensor, the microprocessor further configured to determine third and fourth amounts of assist torque applied to a vehicle steering system at the first and second times respectively, the microprocessor further configured to determine a first total torque value based on the first amount of torque and the third amount of assist torque, the microprocessor further configured to determine a second total torque value based on the second amount of torque and the fourth amount of assist torque, the microprocessor further configured to determine a delta torque value based on a difference between the first and second total torque values, the microprocessor further configured to determine a delta rotational position value based on a difference between the first and second relative rotational positions, the microprocessor further configured to determine a slope value based on the delta torque value and the delta rotational position value, the microprocessor further configured to set an absolute rotational position value equal to a predetermined steering travel limit of the vehicle handwheel when the microprocessor determines that the slope value is within a predetermined slope range, the absolute rotational position value indicating the absolute rotational position of the vehicle handwheel when the slope value is within the predetermined slope range, the microprocessor further configured to store the absolute rotational position value in a memory device.

11. The system of claim 10, wherein the predetermined steering travel limit is at least one of a predetermined clockwise steering travel limit and a predetermined counter-clockwise steering travel limit.

12. The system of claim 10, wherein the slope value is within the predetermined slope range when the slope value is greater than or equal to a threshold slope value.

13. A method for determining an absolute rotational position of a vehicle handwheel, comprising:

determining first and second amounts of assist torque applied to a vehicle steering system at first and second times, respectively;

determining first and second relative rotational positions of the vehicle handwheel at the first and second times, respectively;

determining a delta torque value based on a difference between the first and second amounts of assist torque;

determining a delta rotational position value based on a difference between the first and second relative rotational positions;

determining a slope value based on the delta torque value and the delta rotational position value;

using a microprocessor to determine when the slope value is within a predetermined slope range and to set an absolute rotational position value equal to a predetermined steering travel limit of the vehicle handwheel when the slope value is within the predetermined slope range, the absolute rotational position value indicating the absolute rotational position of the vehicle handwheel; and using the microprocessor to store the absolute rotational position value in a memory device.

14. The method of claim 13, wherein the predetermined steering travel limit is at least one of a predetermined clockwise steering travel limit and a predetermined counter-clockwise steering travel limit.

15. The method of claim 13, wherein the slope value is within the predetermined slope range when the slope value is greater than or equal to a threshold slope value.

16. The method of claim 1, wherein the step of determining first and second relative positions comprises receiving a signal indicative of a relative rotational position of a rotor of a steering assist motor.

17. The method of claim 16, wherein the relative rotational position of a rotor of a steering assist motor is further indicative of a relative rotational position of the vehicle handwheel.

* * * * *